Nov. 11, 1958     A. B. CADY     2,859,857
LOAF STRAIGHTENER

Filed June 20, 1956     4 Sheets-Sheet 1

INVENTOR.
Arthur B. Cady
BY
Otto Moeller
Attorney

Nov. 11, 1958 — A. B. CADY — 2,859,857
LOAF STRAIGHTENER
Filed June 20, 1956 — 4 Sheets-Sheet 2

INVENTOR.
Arthur B. Cady
BY
Otto Moeller
Attorney

Nov. 11, 1958 — A. B. CADY — 2,859,857
LOAF STRAIGHTENER
Filed June 20, 1956 — 4 Sheets-Sheet 3

INVENTOR.
Arthur B. Cady
BY Otto Moeller
Attorney

Nov. 11, 1958     A. B. CADY     2,859,857
LOAF STRAIGHTENER

Filed June 20, 1956     4 Sheets—Sheet 4

INVENTOR.
Arthur B. Cady
BY
Otto Moeller
Attorney United States Patent Office 2,859,857

Patented Nov. 11, 1958

2,859,857

LOAF STRAIGHTENER

Arthur B. Cady, York, Pa., assignor, by mesne assignments, to Capital Products Corporation, Mechanicsburg, Pa., a corporation of Pennsylvania Application June 20, 1956, Serial No. 592,621

6 Claims. (Cl. 198—33)

This invention relates to bread loaf straightening means for arranging them while in transit in parallel relation with respect to their long dimension.

In bakery practice when the pans of baked bread are delivered from the oven the loaves are removed manually or by mechanical means from the pans and transported by conveying means to a bread cooler into which the loaves are delivered by mechanical means. For efficient operation of the means for introducing the loaves into the cooler, it is important that the loaves are uniformly alined with their long dimensions in parallelism. It is a primary object of this invention to provide means interposed in the bread loaf conveying system between the depanning station and the cooler for so positioning the loaves of bread.

It is another object of the invention to provide such loaf orienting means that eliminates manual handling of the loaves of bread.

The hot loaves of bread being delivered to the cooler are soft and fragile, and it is a further object to provide a loaf orienting device of the above type that handles the loaves gently without marring or damaging the same.

Other objects and advantages of the invention will become apparent from the following description which, considered in connection with the accompanying drawings, sets forth the preferred embodiment of the invention.

In the drawings:

Figure 1 is a view in perspective of the loaf straightening apparatus, with the conveyors leading thereto and therefrom being shown fragmentarily;

Figure 2 is a plan view of the invention;

Figure 3 is a sectional view taken on the line 3—3 of Figure 2;

Figure 4 is a sectional view taken on the line 4—4 of Figure 2;

Figure 5 is a diagrammatic view of the invention;

Figure 6 is a longitudinal vertical central section through a modified form of the invention;

Figure 7 is a sectional view taken on line 7—7 of Figure 6;

Figure 8 is a fragmentary sectional view taken on line 8—8 of Figure 6; and

Figure 9 is a view of a modified form of roller that may be employed in the loaf straightening apparatus.

Referring to the drawings, my loaf straightening device includes a box-like frame 10 supported on legs 11 depending from the lower four corners of the frame 10. The box-like frame 10 is formed with similar longitudinally spaced end frame members 12 and 13, provided respectively with rectangular bearing plates 14 and 15 disposed in parallel vertical transverse planes. The box-like frame 10 is completed by a pair of longitudinally extending elongated plates 16 and 17 disposed in transversely spaced parallelism with respect to each other and rigidly secured, in any suitable manner, at their respective ends on the horizontal top plates 18 and 19 of the end frame members 12 and 13 respectively, and a similar pair of plates 20 and 21 rigidly secured at their respective ends on the horizontal bottom plates 22 and 23 of the end frame members 12 and 13 respectively. As shown in the drawings, the longitudinally extending plates 16, 17, 20 and 21 are preferably disposed a short distance inwardly of the lateral extremities of the end frame members 12 and 13.

A plurality of vertical equidistantly separated spacer bars 24 are rigidly secured in any suitable manner, at their respective upper and lower ends to the upper and lower longitudinally extending plates 16 and 20 at one side of the box-like frame 10. Similarly, spacer bars 25 are secured to upper and lower plates 17 and 21 at the opposite side of the box-like frame 10. As best shown in Figure 4, the spacer bars 24 may have their upper ends bent inwardly to overlie the plate 16, and their lower ends bent inwardly to underlie the plate 20. The inwardly bent portions of the spacer bars 24 may then be secure to the plates 16 and 20 by flat head screws 26 and nuts 27. The spacer bars 25 may be secured in similar manner to the plates 17 and 21.

Extending transversely through the box-like frame 10 between upper longitudinally extending plates 16, 17 and lower longitudinally extending plates 20, 21 and between adjacent pairs of spacer bars 24 and 25, are rectangular vertically disposed roller supporting frames 28. The frames 28 are defined by upper and lower horizontal frame members 29 and 30 joined at their ends by vertical end frame members 31 and 32. Thus, with the lower frame members 30 of the frames 28 resting on the lower plates 20, 21 of the box-like frame 10, and the upper frame members 29 subjacent the upper plates 16 and 17, vertical displacement of the frames 28 is prevented; and with the side edges of upper and lower frame members 29 and 30 slidingly engaging the spacer bars 24 and 25, longitudinal displacement of the frames 28 is prevented. The frames 28 are, however, free to be slid back and forth in a transverse direction, with the plates 16, 17, 20 and 21, and the spacer bars 24 and 25 acting as guides and constraining movement of the frames 28 in such transverse direction.

The end frame members 31 and 32 of the frames 28 are provided respectively, with upwardly extending projections 33 and 34, in which are rotatably mounted the transversely extending rollers 35. Means, to be described, is provided for imparting to the frames 28 and the rollers 35 supported thereby, reciprocating movement in the transverse direction referred to above, such means being arranged to move one set of alternate rollers in a direction opposite the movement of the other set of alternate rollers.

The means for imparting reciprocating movement to the frames 28 and the rollers 35 supported thereby includes a shaft 36 extending longitudinally and centrally through the box-like frame 10. The shaft 36 is rotatably mounted at its opposite ends in bearings 37 and 38 supported by the bearing plates 14 and 15, respectively, of the end frame members 12 and 13. An external extension 39 of the shaft 36 has a sheave 40 secured thereon which is connected by a belt 41 to a sheave 42 secured on the shaft 43 of a gear head motor 44. The motor 44 may be supported in any suitable manner from the end frame member 12.

Secured eccentrically to the shaft 36 for rotation therewith are a plurality of cam discs 45, one for each of the roller supporting frames 28, disposed in vertical planes alined with the frames 28. The cam discs 45 alined with the one set of alternate frames 28 are arranged in diametrically opposite phase with respect to the cam discs 45 of the other set of alternate frames 28. Each of the frames 28 is provided between its end frame members 31, 32 with vertical bars 46 and 47 joined at their respective ends to the upper and lower frame members 29 and 30 of the frames 28. The bars 46 and 47 are spaced apart a distance equal to the diameter of the discs 45 so as to be engaged by the periphery of the discs. Thus, as the shaft 36 rotates, engagement of the discs 45 with the bars 46 and 47, causes the frames to move transversely in a back and forth or reciprocating path, and since the cam discs are in alternating opposite phase, one set of alternate frames 28 and rollers supported thereby will be moved in one direction while the other set of alternate frames 28 and rollers supported thereby will be moved in the opposite direction.

Figure 5:
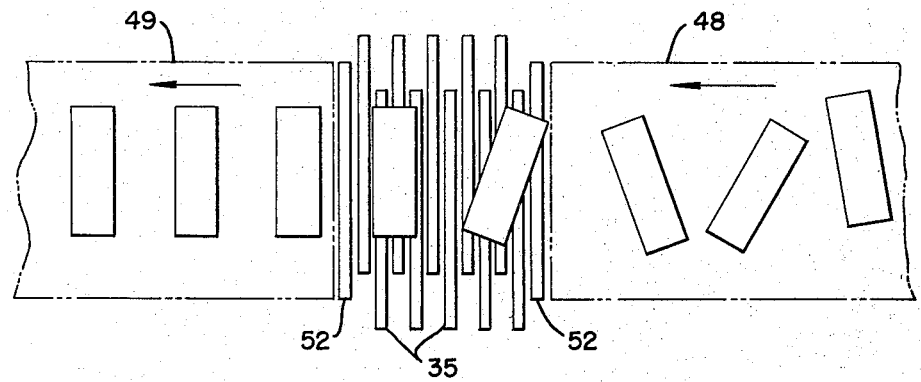

Leading to the loaf straightening device is an infeed conveyor 48 and leading from the loaf straightening device is a discharge conveyor 49. These conveyors may be of any suitable type, being shown for purpose of illustration as roller conveyors. The conveyors 48 and 49 are power driven, the drive means not being shown, since such powered roller conveyors are conventional in the art of conveyors. Referring particularly to Figure 5, infeed conveyor 48 may lead from an automatic bread depanner (not shown) or a manual bread depanning station where loaves of bread fresh from the oven are depanned and deposited on the infeed conveyor 48. As deposited on the infeed conveyor 48, referring again to Figure 5, the loaves of bread are generally misalined, in other words, the long axes of the loaves are not in parallel relation with respect to each other but are in haphazard angular relation. In delivering the hot depanned loaves of bread to a bread cooler, it is important that the loaves be arranged with their long axes in parallelism, as shown on conveyor 49 in Figure 5, to make possible the use of automatic means for introducing the loaves onto the trays or conveyors of a bread cooler.

As the misalined loaves delivered from powered infeed conveyor 48 pass across the rollers of the loaf straightener device by the impetus received from the powered conveyor 48, the reciprocation of one set of alternate rollers in one direction and the other set of alternate rollers in the opposite direction cause the loaves to assume a position such that their long axes are parallel with respect to each other and to the axes of the rollers 35, as diagrammatically shown in Figure 5. The axially parallel loaves are then delivered to discharge conveyor 49 for delivery to the bread cooler. In order to deliver the loaves to the discharge conveyor 49 centralized between the sides thereof, the loaf straightener is provided with a pair of longitudinally extending laterally spaced guideplates 50, as best shown in Figures 1 to 4. The guideplates 50 are supported above the rollers 35 by brackets 51 which are secured to the box-like frame 10. The spaces between the end movable rollers 35 and the adjacent ends of conveyors 48 and 49 are bridged by stationary rotating rollers 52 supported on the end frame members 12 and 13 by brackets 53.

Figure 1:
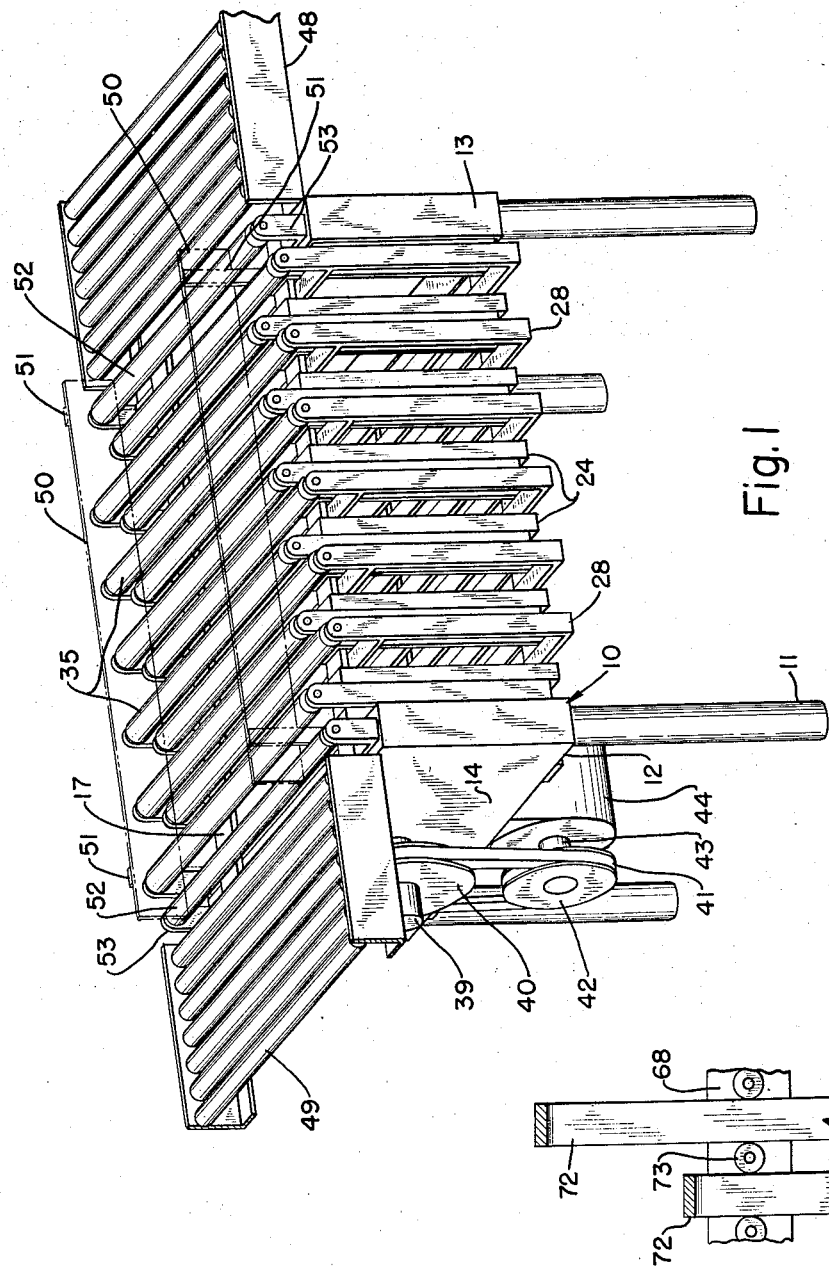
Figure 2:
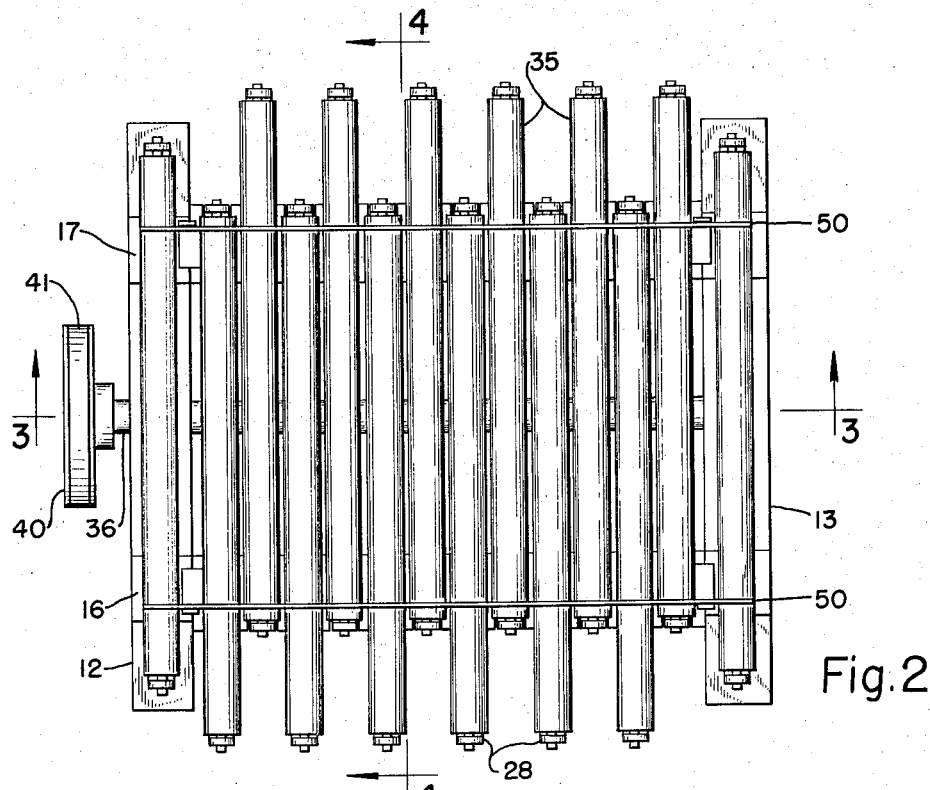
Figure 3:
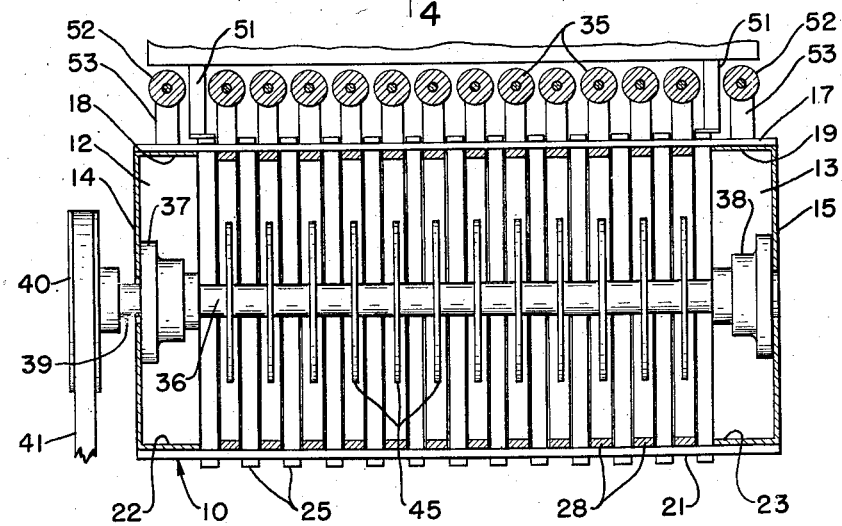
Figure 6:
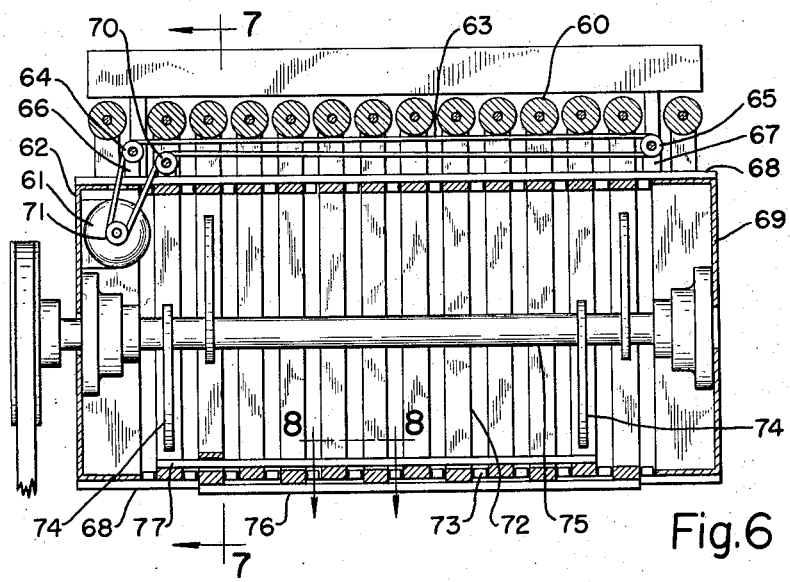
Figure 4:
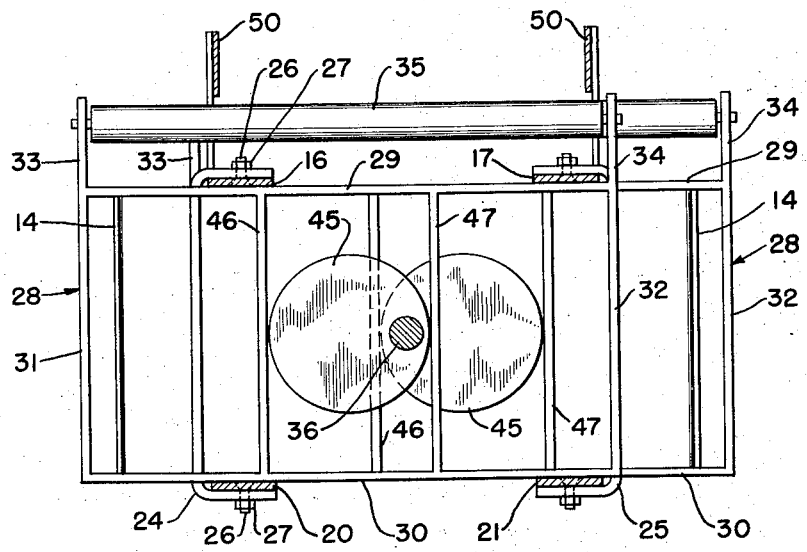
Figure 7:
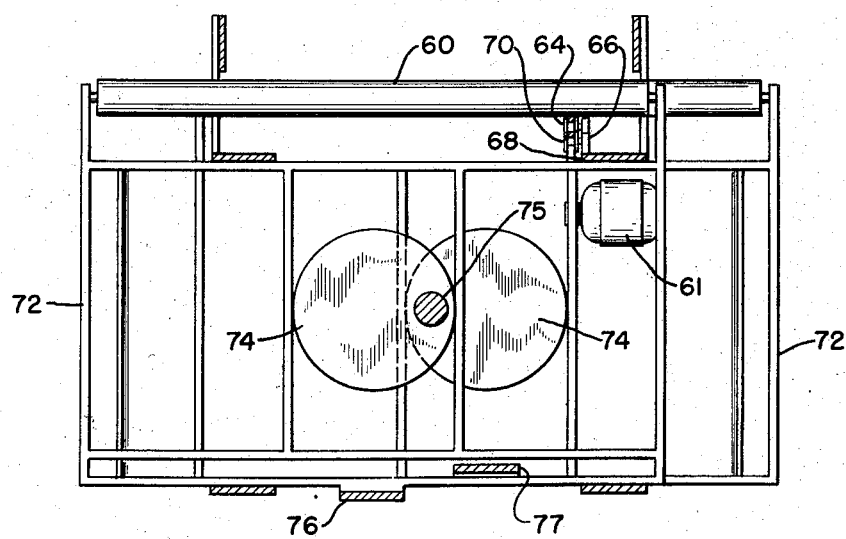

In Figures 6, 7 and 8 is shown a modified form of the invention in which, among other things, the rollers 60, corresponding to the rollers 35 of the previously described form of the invention, are power driven. The drive means includes a motor 61 supported on the inner side of an end frame member 62 corresponding to end frame member 12 of the form of the invention first described. An endless belt 63 has its upper run trained over rollers 64 and 65 supported, respectively, by brackets 66 and 67 mounted on opposite ends of a longitudinally extending upper plate 68 of the box-like frame 69, the plate 68 and box-like frame 69 corresponding respectively to the plate 17 and box-like frame 10 of the previously described form of the invention. The upper run of the endless belt 63 engages the lower peripheral portions of the rollers 60 for driving the same. The return run of belt 63 passes over guide roller 70 and is trained over a sheave 71 of the shaft of motor 61.

In the modified form of the invention, the transversely reciprocatingly movable roller supporting frames 72, corresponding to the roller supporting frames 28 of the first form of the invention, are maintained in spaced relation by a plurality of rollers 73 mounted on vertical axes on the longitudinally extending plate 68 and the similar plates 68 defining the other three edges of the box-like frame 69. The rollers 73 facilitate reciprocating movement of the roller supporting frames 72.

Furthermore, in the modified form of the invention, cam discs 74 are provided on shaft 75 in alinement with the first and last only of one set of alternate roller supporting frames 72, and the first and last only of the other set of alternate roller supporting frames 72. However, each complete set of alternating frames 72 is arranged to be moved as a unit upon rotation of the shaft 75, by means of a tie bar 76 connecting the one set of alternating frames 72 and a tie bar 77 connecting the other set of alternating frames 72. It will be apparent that inasmuch as the frames 72 of each set of alternate frames 72 are joined together for movement as a unit, the cam discs 74 need not necessarily be disposed on the shaft 75 in alinement with the end frames 72, but can be disposed to engage any one or more of the intermediate frames 72.

Figure 9:
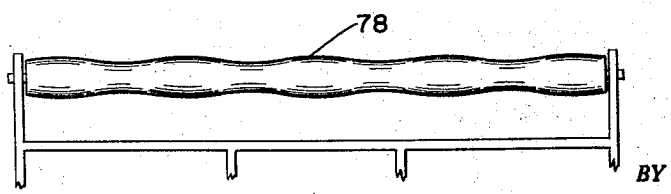

In Figure 9 is shown a roller 78 having an undulating surface that may be substituted for the smooth rollers of the other forms of the invention.

While the invention has been described with particular reference to means for arranging loaves of bread with their long axes in parallelism, it will be apparent that the apparatus is adapted for similarly arranging other articles in transit along a conveyor.

I claim:

1. In an apparatus for arranging bread loaves in parallelism with respect to their long dimension, the combination of a plurality of parallel loaf supporting rollers disposed in a common plane and across which bread loaves are adapted to pass in a direction transversely of the axes of said rollers, a supporting frame for each of said rollers, a supporting frame structure for supporting said roller supporting frames, said supporting frame structure having spacer members for retaining said roller supporting frames in mutually parallel spaced relation, said supporting frame structure and spacer members restricting said roller supporting frames to movement in the axial direction of said rollers, a shaft carried by said supporting frame structure below the plane of said rollers, means for rotating said shaft, said shaft having cam means operatively associated with said roller supporting frames for reciprocating one set of alternate frames and rollers supported thereby in a direction opposite that of the other set of alternate frames and rollers supported thereby.

2. An apparatus as defined in claim 1, including power operated means for rotating said rollers.

3. An apparatus as defined in claim 1, wherein said spacer members are rotatably mounted rollers, and wherein said roller supporting frames are engageable with the periphery of said rollers.

4. In an apparatus for arranging bread loaves in parallelism with respect to their long dimension, the combination of a plurality of parallel loaf supporting rollers disposed in a common plane and across which bread loaves are adapted to pass in a direction transversely of the axes of said rollers, a plurality of frames subtending and severally supporting said rollers, a box-like frame structure for supporting said roller supporting frames and including means for retaining said roller supporting frames in mutually parallel spaced relation, said box-like frame structure and spacing means restricting said roller supporting frames to movement in the axial direction of said rollers, a shaft carried by said box-like frame structure, means for rotating said shaft, said shaft having cam means operatively associated with said roller supporting frames for simultaneously reciprocating one group of alternate frames and rollers supported thereby in a direction opposite that of the other group of alternate frames and rollers supported thereby.

5. In an apparatus for arranging bread loaves in parallelism with respect to their long dimension, the combination of a plurality of parallel loaf supporting rollers disposed in a common plane and across which bread loaves are adapted to pass in a direction transversely of the axes of said rollers, a rectangular supporting frame for each of said rollers, a box-like frame structure for carrying said roller supporting frames in upright position, said box-like frame structure having spacer members for retaining said roller supporting frames in mutually parallel spaced relation, said box-like frame structure and spacer members restricting said roller supporting frames to movement in the axial direction of said rollers, a shaft extending through said box-like frame structure perpendicular with respect to the planes of said roller supporting frames, means for rotating said shaft, said shaft having oppositely extending throws each engageable with a respective roller supporting frame for imparting reciprocating movement to said frames and the rollers supported thereby in alternate opposite directions.

6. In an apparatus for arranging bread loaves in parallelism with respect to their long dimension, the combination of a plurality of parallel loaf supporting rollers disposed in a common horizontal plane and across which bread loaves are adapted to pass in a direction transversely of the axes of said rollers, a plurality of rectangular frames subtending and severally supporting said rollers, a box-like frame structure for supporting said roller supporting frames in upright position, said box-like frame structure having spacer members for retaining said roller supporting frames in mutually parallel spaced relation, said box-like frame structure and spacer members restricting said roller supporting frames to movement in the axial direction of said rollers, a shaft extending through said box-like frame structure and said roller supporting frames, means for rotating said shaft, a plurality of cams individual to said roller supporting frames mounted for rotation on said shaft, said roller supporting frames having vertically disposed bars engaging opposed peripheral surfaces of said cams whereby to impart reciprocating movement to said roller supporting frames, said cams being disposed in alternate diametrically opposed relation with respect to each other for moving one set of alternate roller supporting frames in a direction opposite the movement of the other set of alternate roller supporting frames.

References Cited in the file of this patent
UNITED STATES PATENTS

| 2,612,595 | Warren | Sept. 30, 1952 |
| 2,781,119 | Talbot | Feb. 12, 1957 |